(12) United States Patent
Cao

(10) Patent No.: US 8,708,558 B2
(45) Date of Patent: Apr. 29, 2014

(54) TEMPERATURE DETECTING APPARATUS

(75) Inventor: Xiang Cao, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 948 days.

(21) Appl. No.: 12/771,075

(22) Filed: Apr. 30, 2010

(65) Prior Publication Data
US 2011/0226463 A1 Sep. 22, 2011

(30) Foreign Application Priority Data

Mar. 22, 2010 (CN) .......................... 2010 1 0129491

(51) Int. Cl.
*G05D 23/30* (2006.01)

(52) U.S. Cl.
USPC ............................ 374/135; 374/120; 374/100

(58) Field of Classification Search
CPC .................................................. G05D 23/1934
USPC ......... 374/120, 135, 100, 184, 45, 1, 4, 5, 29, 374/141, 163, 185; 165/287; 454/229; 318/268, 400.08, 471–473, 442, 479, 318/504; 361/688, 679.48, 695; 700/300; 388/800, 934; 417/18, 32, 45, 63, 217, 417/292, 315, 423.14
See application file for complete search history.

(56) References Cited

U.S. PATENT DOCUMENTS

| | | | | |
|---|---|---|---|---|
| 4,426,604 A * | 1/1984 | Doemen et al. | ............... | 388/816 |
| 5,564,627 A * | 10/1996 | Veitenhansl | ............. | 237/12.3 B |
| 6,005,770 A * | 12/1999 | Schmitt | .......................... | 361/695 |
| 6,229,701 B1 * | 5/2001 | Kung et al. | ................... | 361/688 |
| 6,380,704 B1 * | 4/2002 | Chin | ............................ | 318/268 |
| 6,396,231 B1 * | 5/2002 | Horng et al. | .................. | 318/471 |
| 6,617,815 B1 * | 9/2003 | Krief | ............................. | 318/471 |
| 6,643,128 B2 * | 11/2003 | Chu et al. | ................. | 361/679.48 |
| 7,201,651 B2 * | 4/2007 | Su | ................................. | 454/184 |
| 7,202,624 B2 * | 4/2007 | Hardt et al. | .................. | 318/461 |
| 7,238,104 B1 * | 7/2007 | Greenslade et al. | .......... | 454/184 |
| 7,310,737 B2 * | 12/2007 | Patel et al. | ..................... | 713/300 |
| 7,416,481 B2 * | 8/2008 | Baker et al. | .................... | 454/184 |
| 7,570,009 B2 * | 8/2009 | Hsieh et al. | ................... | 318/779 |
| 7,609,018 B2 * | 10/2009 | Lin et al. | ....................... | 318/471 |
| 7,701,158 B2 * | 4/2010 | Wu et al. | ........................ | 318/268 |
| 8,159,160 B2 * | 4/2012 | Dishman et al. | .............. | 318/268 |
| 8,174,227 B2 * | 5/2012 | Huang | ........................... | 318/472 |
| 8,324,854 B2 * | 12/2012 | Huang | ........................... | 318/472 |
| 8,324,855 B2 * | 12/2012 | Huang | ........................... | 318/472 |
| 2005/0082053 A1 * | 4/2005 | Halabi | ........................... | 165/217 |
| 2006/0109627 A1 * | 5/2006 | Lee | ................................. | 361/695 |
| 2009/0096402 A1 * | 4/2009 | Miyajima et al. | ............. | 318/473 |
| 2009/0208333 A1 * | 8/2009 | Smith et al. | ........................ | 416/5 |
| 2011/0101903 A1 * | 5/2011 | Huang | ........................... | 318/472 |
| 2012/0285183 A1 * | 11/2012 | Fiedler et al. | ..................... | 62/62 |

\* cited by examiner

*Primary Examiner* — Peter Macchiarolo
*Assistant Examiner* — Tania Courson
(74) *Attorney, Agent, or Firm* — Novak Druce Connolly Bove + Quigg LLP

(57) ABSTRACT

A temperature detecting apparatus for adjusting heat dissipating angle of a fan according to status of heat sources, includes detection module, a comparison module, a control module, and a driver module. The detection module detects temperatures of the heat sources, and converts the detected temperatures to voltage signals. The comparison module receives the voltage signals, and compares the voltage signals with a reference voltage to output control signals. The control module receives the control signals, and turns on according to the control signals. The driver module drives a plurality of air guiding fins rotating thereon. A direction of current flowing through the driver module is adjustable when the control module turns on. The driver module drives the air guiding fins turning toward to guide air flowing to one of the heat sources according to the direction of the current.

10 Claims, 3 Drawing Sheets

TEMPERATURE DETECTING APPARATUS

BACKGROUND

1. Technical Field

The present disclosure relates to temperature detecting apparatuses, and particularly to a temperature detecting apparatus for detecting temperature in a PC chassis.

2. Description of Related Art

Developments in today's information-intensive society have led to remarkable improvements in performances of electronic devices. During operation of many contemporary electronic devices such as computers, central processing units (CPUs) produce large amounts of heat. Typically, one or more fans are used to facilitate removal of heat in a computer. However, each fan can only dissipate heat for a fixed heat source. A PC usually needs a plurality of fans to dissipate heat for different heat sources, which increases the cost and has low efficiency.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
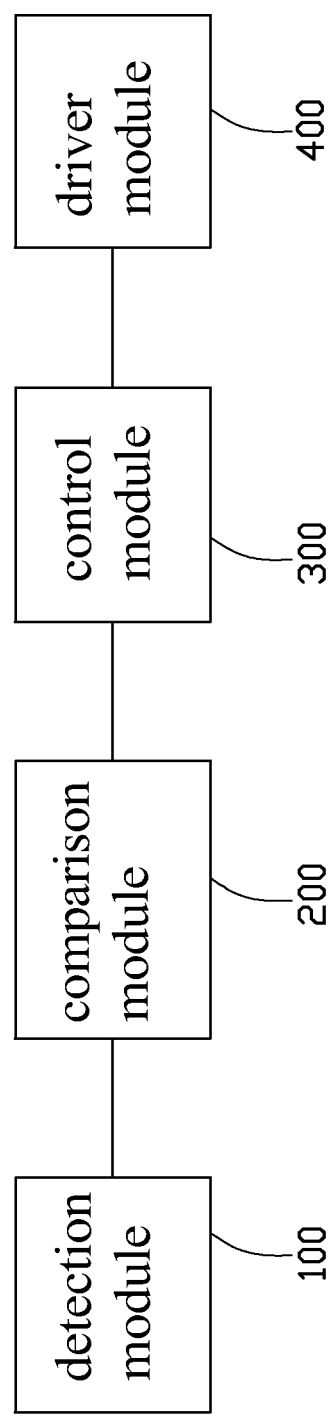
FIG. 1 is a block view of an embodiment of a temperature detecting apparatus.

Referring to FIG. 1, a temperature detecting apparatus in an embodiment for adjusting heat dissipating angle of a fan (not shown) according to status of heat sources, includes a detection module 100, a comparison module 200, a control module 300, and a driver module 400. The detection module 100 detects temperatures of the heat sources, and converts the detected temperatures to voltage signals. The comparison module 200 receives the voltage signals, and compares the voltage signals with a reference voltage to output control signals. The control module 300 receives the control signals, and turns on according to the control signals. The driver module 400 drives a plurality of air guiding fins (not shown) rotating thereon. A direction of current flowing through the driver module 400 is adjustable when the control module 300 turns on. The driver module 400 drives the air guiding fins turning toward to guide air flowing to one of the heat sources according to the direction of the current. In one embodiment, the driver module 400 includes at least one motor 401.

Figure 2:
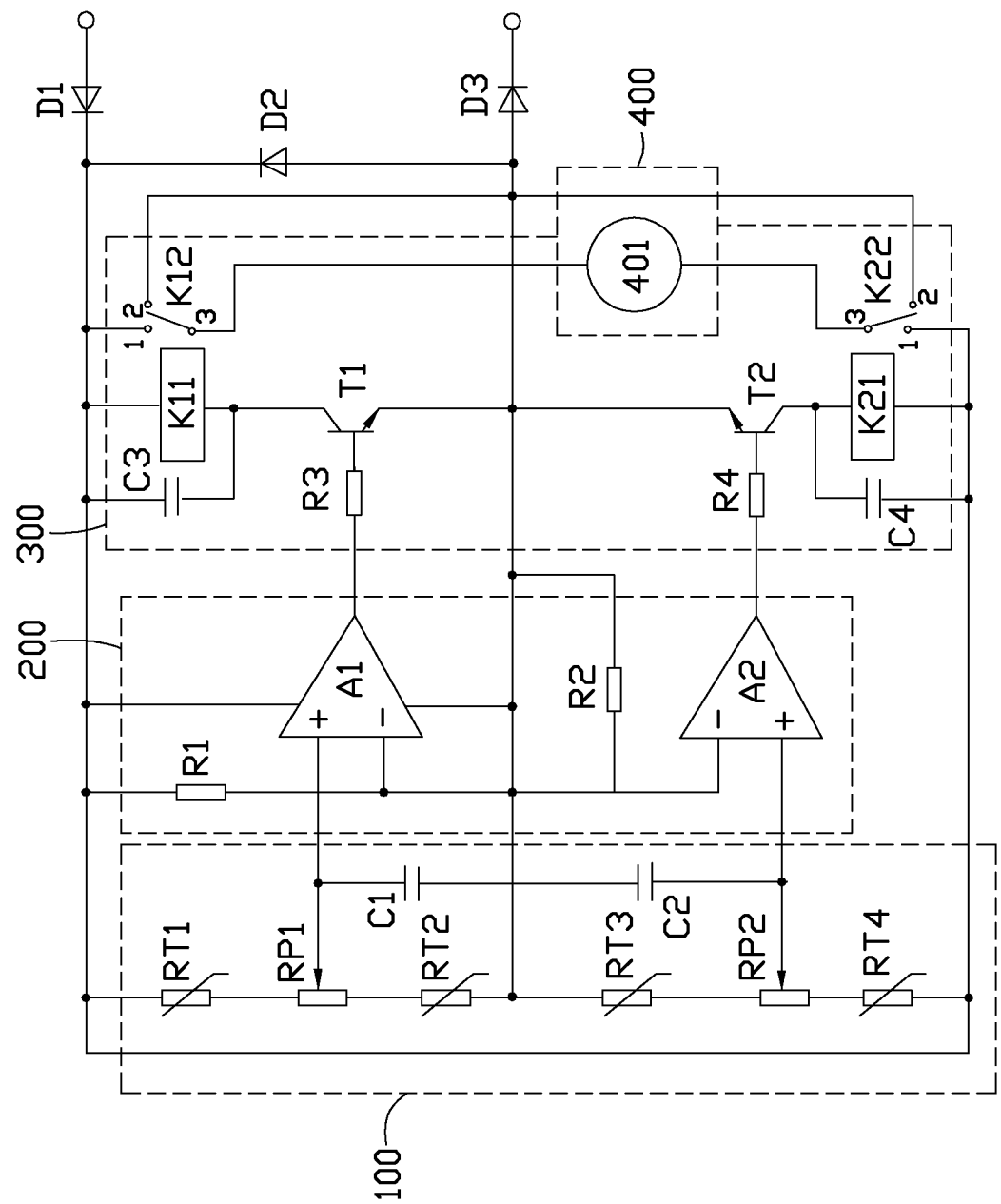
FIG. 2 is a circuit view of an embodiment of the temperature detecting apparatus of FIG. 1.
Figure 3:
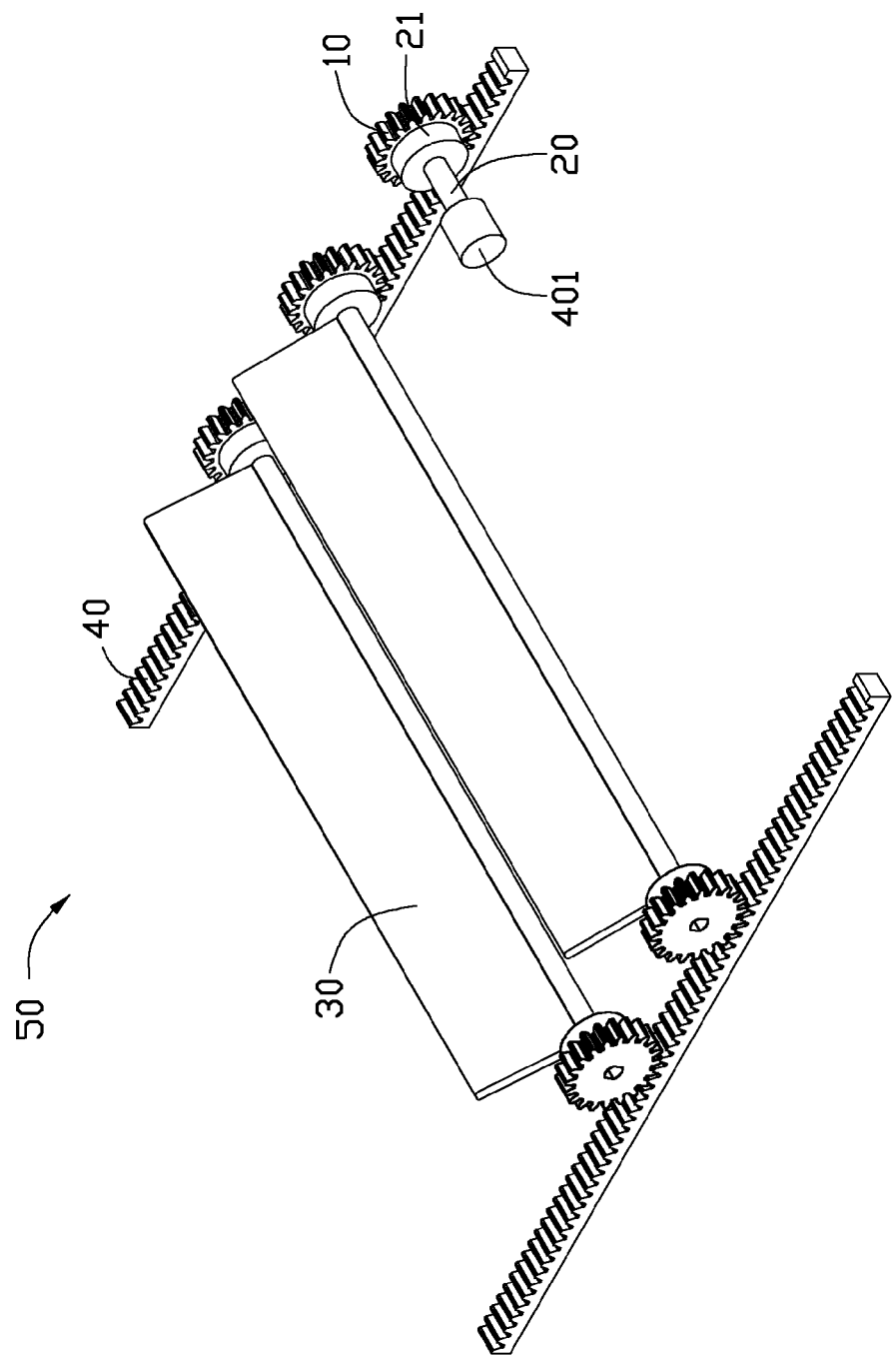
FIG. 3 is an isometric view of an embodiment of a temperature detecting apparatus fixed in a PC chassis.

Referring to FIG. 2 and FIG. 3, the detection module 100 includes thermal resistors RT1~RT4 and variable resistors RP1 and RP2. A thermal resistor RT1 first terminal is electrically coupled to a diode D1 cathode. A diode D1 anode receives a +12 volts DC voltage. A thermal resistor RT1 second terminal is electrically coupled to a thermal resistor RT2 first terminal via the variable resistor RP1. A thermal resistor RT2 second terminal is electrically coupled to a diode D3 anode. A diode D3 cathode is grounded. A thermal resistor RT4 first terminal is electrically coupled to the diode D1 cathode. A thermal resistor RT4 second terminal is electrically coupled to a thermal resistor RT3 first terminal via the variable resistor RP2. A thermal resistor RT3 second terminal is electrically coupled to the diode D3 anode. The diode D3 anode is electrically coupled to a diode D2 anode. A diode D2 cathode is electrically coupled to the diode D1 cathode. In one embodiment, the thermal resistors RT1 and RT3 are positioned in an upper portion of a PC chassis (not shown) 50; the thermal resistors RT2 and RT4 are positioned in a lower portion of the PC chassis.

The comparison module 200 includes comparators A1 and A2, resistors R1 and R2, and capacitors C1 and C2. A comparator A1 non-inverting input terminal is electrically coupled to a variable resistor RP1 adjusting terminal. A comparator A1 inverting input terminal is electrically coupled to the diode D3 anode and to the diode D1 cathode via the resistor R1. A comparator A2 non-inverting input terminal is electrically coupled to a variable resistor RP2 adjusting terminal. A comparator A2 inverting input terminal is electrically coupled to the diode D3 anode and to the diode D3 anode via the resistor R2. The comparator A1 non-inverting input terminal is electrically coupled to the comparator A2 non-inverting input terminal via the capacitors C1 and C2 that are coupled in series.

The control module 300 includes transistors T1 and T2, a first and a second relay, resistors R3 and R4, and capacitors C3 and C4. The first relay includes a winding K11 and a switch K12. The second relay includes a winding K21 and a switch K22. A transistor T1 base and a transistor T2 base are electrically coupled to a comparator A1 output terminal and a comparator A2 output terminal via the resistors R3 and R4 respectively. A transistor T1 emitter and a transistor T2 emitter are electrically coupled to the diode D3 anode. A transistor T1 collector is electrically coupled to the diode D1 cathode via the winding K11. A switch K12 first terminal is electrically coupled to the diode D1 cathode. A switch K12 second terminal is electrically coupled to the diode D3 anode. A transistor T2 collector is electrically coupled to the diode D1 cathode via the winding K21. A switch K22 first terminal is electrically coupled to the diode D1 cathode. A switch K22 second terminal is electrically coupled to the diode D3 anode. A switch K22 third terminal is electrically coupled to a switch K12 third terminal via the driver module 400. The capacitors C3 and C4 are parallelly coupled with the windings K11 and K21 respectively. In one embodiment, the transistors T1 and T2 are NPN type transistors.

The motor 401 is fixed on a rotating axis 20 of the PC chassis 50. Two cams 21 are extended from two ends of each of the rotating axis 20. A transmission gear 10 is fixed on a top of each cam 21. An air guiding fin 30 is fixed on a middle of each rotating axis 20. The motor 401 drives the corresponding transmission gears 10 turning relative to a transmission rail 40. The air guiding fins 30 rotate when the transmission gears 10 turn relative to a transmission rail 40. An opening between two adjacent air guiding fins 30 is able to be adjusted. A direction of airflow from the fan is able to be adjusted by the air guiding fins 30. Therefore, the fan dissipates heat for different heat sources according to temperature status in the PC chassis 50.

In an initial state, the switches K12 and K22 second and third terminals are closed. The +12 volts DC voltage generates a +6 volts reference voltage at the comparators A1 and A2 inverting input terminals. When the temperature in the PC chassis 50 is stable, the adjusting terminals adjust a resistance of the variable resistors RP1 and RP2. The non-inverting input terminals voltage levels of the comparators A1 and A2 are greater than that of the corresponding inverting input terminals. The comparators A1 and A2 output a high voltage level at the corresponding output terminals. The transistors T1 and T2 turn on. The windings K11 and K21 are powered on. The switches K12 and K22 close the corresponding first and third terminals. The motor 401 is in an idle state.

In use, if the temperature in the upper portion of the PC chassis 50 is greater than that of the lower portion, a resistance of the thermal resistors RT1 and RT3 decreases. The non-inverting input terminal voltage level of the comparator A1 increases. The comparator A1 still outputs a high voltage level at the output terminal. The transistor T1 turns on. The winding K11 is powered on. The switch K12 closes the first and third terminals. The non-inverting input terminal voltage level of the comparator A2 decreases. The comparator A2 outputs a low voltage level at the output terminal. The transistor T2 turns off. The winding K21 is powered off. The switch K22 still closes the second and third terminals. A current flows through the motor 401 in a counterclockwise direction. The motor 401 drives the air guiding fins 30 turning toward a first direction. The air guiding fins 30 guides air flowing to heat sources in the upper portion of the PC chassis 50. The fan dissipates heat for heat sources in the upper portion of the PC chassis 50.

If temperature in the upper portion of the PC chassis 50 is lower than that of the lower portion, a resistance of the thermal resistors RT2, RT4 decreases. The non-inverting input terminal voltage level of the comparator A1 decreases. The comparator A1 outputs a low voltage level at the output terminal. The transistor T1 turns off. The winding K11 is powered off. The switch K12 still closes the second and third terminals. The non-inverting input terminal voltage level of the comparator A2 increases. The comparator A2 still outputs a high voltage level at the output terminal. The transistor T2 turns on. The winding K21 is powered on. The switch K22 closes the first and third terminals. A current flows through the motor 401 in a clockwise direction. The motor 401 drives the air guiding fins 30 turning toward a second direction. The guiding fins 30 guides air flowing to heat sources in the lower portion of the PC chassis 50. The fan dissipates heat for heat sources in the lower portion of the PC chassis 50.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A temperature detecting apparatus for adjusting direction of airflow from a fan according to status of heat sources in a chassis, the chassis comprising a first portion and a second portion, the temperature detecting apparatus comprising:
    a detection module capable of detecting temperatures of the heat sources, and converting the detected temperatures to voltage signals;
    a comparison module capable of receiving the voltage signals, and comparing the voltage signals with a reference voltage to output control signals;
    a control module capable of receiving the control signals and turning on according to the control signals; and
    a driver module comprising a motor, the motor capable of driving a plurality of air guiding fins rotating thereon; wherein the control module controls a current to flow through the motor in a clockwise direction or a counterclockwise direction; when the current flows through the motor in the counterclockwise direction, the motor drives the air guiding fins to turn toward a first direction, and the guiding fins guide air to flow to the heat sources at the first portion of the chassis; when the current flows through the motor in the clockwise direction, the motor drives the air guiding fins to turn toward a second direction, and the guiding fins guide air to flow to the heat sources at the second portion of the chassis.

2. The temperature detecting apparatus of claim 1, wherein the detection module comprises a first thermal resistor, a second thermal resistor, a third thermal resistor, and a fourth thermal resistor; a first thermal resistor first terminal is capable of receiving a DC voltage; a first thermal resistor second terminal is grounded via the second thermal resistor; a fourth thermal resistor first terminal is capable of receiving the DC voltage; a fourth thermal resistor second terminal is grounded via the third thermal resistor.

3. The temperature detecting apparatus of claim 2, wherein the detection module further comprises a first variable resistor and a second variable resistor; the first variable resistor is electrically coupled between the first and second thermal resistors; the second variable resistor is electrically coupled between the third and fourth thermal resistors.

4. The temperature detecting apparatus of claim 3, wherein the comparison module comprises a first comparator, a second comparator, a first resistor, and a second resistor; the first comparator non-inverting input terminal is electrically coupled to the first variable resistor adjusting terminal; the first comparator inverting input terminal is grounded and capable of receiving the DC voltage via the first resistor; the second comparator non-inverting input terminal is electrically coupled to the second variable resistor adjusting terminal; the second comparator inverting input terminal is grounded and grounded via the second resistor.

5. The temperature detecting apparatus of claim 4, wherein the comparison module further comprises a first capacitor and a second capacitor; the first comparator non-inverting input terminal is electrically coupled to the second comparator non-inverting input terminal via the first and second capacitors coupled in series.

6. The temperature detecting apparatus of claim 5, wherein the control module comprises a first transistor, a first relay, a second transistor, and a second relay; the first relay comprises a first winding and a first switch; the second relay comprises a second winding and a second switch; the first and second transistors bases are electrically coupled to the first and second comparators output terminals respectively; the first and second transistors emitters are grounded; the first transistor collector is capable of receiving the DC voltage via the first winding and grounded via the first winding and first switch coupled in series; the second transistor collector is capable of receiving the DC voltage via the second winding and grounded via the second winding and second switch coupled in series.

7. The temperature detecting apparatus of claim 6, wherein each switch comprises a first terminal, a second terminal, and a third terminal; the first and second transistors collectors are electrically coupled to the first and second switches first terminals via the first and second windings respectively; the first and second switches second terminals are grounded; the motor is electrically coupled between the first and second switches third terminals.

8. The temperature detecting apparatus of claim 7, wherein the first and second transistors are capable of turning on according to control signals from the first and second comparators output terminals respectively; the first and second switches are capable of closing the corresponding first and third terminals to adjust the direction of current.

9. The temperature detecting apparatus of claim 7, wherein the control module further comprises a third resistor, a fourth resistor, a third capacitor, and a fourth capacitor; the third resistor is electrically coupled between the first comparator output terminal and the first transistor base; the fourth resistor is electrically coupled between the second comparator output terminal and the second transistor base; the third and fourth capacitors are coupled in parallel with the first and second windings respectively.

10. The temperature detecting apparatus of claim 1, further comprising a first diode, a second diode, and a third diode; the first diode anode is capable of receiving the DC voltage; the first diode cathode is electrically coupled to a connection point between the first thermal resistor and the first winding and electrically coupled to the second diode cathode; the second diode anode is electrically coupled to the third diode anode; the third diode cathode is grounded.

* * * * *